United States Patent [19]

Akao et al.

[11] Patent Number: 4,922,650
[45] Date of Patent: May 8, 1990

[54] SYSTEM FOR MANUFACTURING SOLID MEDIUM

[75] Inventors: Takeshi Akao; Yoshihiko Nishizawa; Shiro Yamada; Hisahumi Fuse; Katsumichi Ohsaki; Morihiko Sakai; Yukujasu Honjo, all of Chiba, Japan

[73] Assignee: Kikkoman Corporation, Noda, Japan

[21] Appl. No.: 243,483

[22] Filed: Sep. 12, 1988

[30] Foreign Application Priority Data

Dec. 14, 1987 [JP] Japan .................................. 62-288298
Jan. 29, 1988 [JP] Japan .................................. 63-16907

[51] Int. Cl.⁵ ............................ A01G 1/04; B65B 9/06
[52] U.S. Cl. ......................................... 47/1.1; 53/552; 414/218
[58] Field of Search ....................... 47/1.1; 422/26, 32; 414/218; 53/452, 451, 551, 552

[56] References Cited

U.S. PATENT DOCUMENTS

| | | | |
|---|---|---|---|
| 1,371,546 | 3/1927 | Bollmann | 422/26 |
| 3,785,111 | 1/1974 | Pike | 53/452 |
| 3,841,465 | 10/1974 | Miller et al. | 414/21 B |
| 4,004,398 | 1/1977 | Larsson et al. | 53/551 |
| 4,059,919 | 11/1977 | Green | 47/1.1 |
| 4,109,792 | 8/1978 | Greenawalt et al. | 53/452 |
| 4,263,744 | 4/1981 | Stoller | 47/1.1 |
| 4,455,111 | 6/1984 | Jackson et al. | 414/218 |
| 4,741,122 | 5/1988 | Becsy et al. | 47/1.1 |

*Primary Examiner*—James R. Feyrer
*Attorney, Agent, or Firm*—Lowe, Price, LeBlanc, Becker & Shur

[57] ABSTRACT

A system for manufacturing a solid medium for cultivating mushrooms includes a mixer for mixing and agitating medium materials, and a heater coupled to the mixer for sterilizing the medium materials from the mixer with the heat of steam. The sterilized medium materials are then delivered into a cooler connected to the heater, and cooled and moistened by water scattered by a sprinkler. The cooler is coupled to a mycelia supply source for supplying mycelia of the mushroom with which the cooled medium materials are spawned. The solid medium thus produced is then packaged by a packaging mechanism in a germ-free environment.

7 Claims, 6 Drawing Sheets

SYSTEM FOR MANUFACTURING SOLID MEDIUM

BACKGROUND OF THE INVENTION

1. Field of the Invention

The present invention relates to a system for manufacturing a culture medium for cultivating mushrooms or the like, and more particularly to a system for manufacturing a solid medium by fully automating the steps of mixing, sterilizing, and cooling medium materials, spawning the medium materials with mycelia to produce a culture medium, and packing the culture medium.

2. Description of the Relevant Art

Some mushrooms have traditionally been cultivated on logs. Various improved mushroom cultivation processes have been proposed. According to one process, for example, mushrooms are cultivated by producing a culture medium by adding nutritional elements such as rice bran to sawdust, filling the medium materials in a small container, heating the medium materials to sterilize the same, cooling the medium materials, and spawning the medium materials with mycelia of the mushroom. This cultivation method is however tedious and time-consuming in that the culture medium has to be manually filled in containers. Since the culture medium is prepared in the atmosphere, it is difficult to prevent various bacteria from entering the culture medium. Inasmuch as the culture medium filled in the container is heated, it takes a considerable time to heat the central area of the culture medium. In addition, the surface area of the culture medium tends to be overheated, whereas the central area thereof tends to be insufficiently heated. If the culture medium is excessively heated, hemicellulose in the sawdust is thermally decomposed into formic acid, which adversely affects the growing of mushrooms. If the heating of the culture medium is insufficient, various germs are developed in the culture medium and contaminate the same.

Japanese Laid-Open Patent Publication No. 55-2243 discloses an apparatus for manufacturing a culture medium for cultivating mushrooms. The disclosed apparatus includes a closed container housing an agitator. The container is supplied with sawdust and rice bran, for example, from a plurality of medium material tanks via feed pipes, and also with water from a water tank. The medium materials and water thus supplied to the container are then agitated and mixed. The container is associated with a jacket which is supplied with steam under a certain pressure from a boiler for sterilizing the medium materials in the container with heat. Since the medium materials are agitated at this time, they are uniformly heated in the surface and central areas. Thereafter, the jacket is supplied with cooling water for cooling the medium materials down to a suitable temperature. Then, the medium materials are fed to another closed container which is of substantially the same structure as that of the aforesaid closed container. The other closed container is heated and cooled before it is supplied with the medium materials. After the other closed container has been cooled to 15° C or below, the medium materials supplied to the other closed container are spawned with mycelia of the mushroom, and the agitator is operated to mix the mycelia in the medium materials thereby to form a culture medium. The produced culture medium is divided into suitable quantities that are then filled in containers. In the disclosed medium manufacturing apparatus, since all of the manufacturing steps are carried out in the closed containers, no various germs can find their way into the medium materials as they are processed into the culture medium. After water has been added to the medium materials, the medium materials are sterilized with the heat of supplied steam. Since the thermal capacity of the culture medium is increased, an increased amount of thermal energy has to be applied during an increased period of time in sterilizing the medium materials. More importantly, only one of the processing steps is performed at a time in the apparatus. Stated otherwise, while a certain step is being carried out, the other steps are not. Such a batch process is of low efficiency.

SUMMARY OF THE INVENTION

It is a major object of the present invention to provide a solid medium manufacturing system capable of continuously manufacturing a solid medium in a germ-free environment.

Another object of the present invention is to provide a solid medium manufacturing system for producing package bags for creating a good environment for the growing of mushroom fungi or mycelia while preventing a mushroom culture medium from being dried.

According to the present invention, there is provided a system for manufacturing a solid medium, comprising: a closed mixer for mixing medium materials; a closed heater coupled to the mixer for sterilizing the medium materials supplied from the mixer, with heat; a mycelia supply device for supplying mycelia; and a closed cooler coupled to the heater for cooling the medium materials supplied from the heater and also coupled to the mycelia supply device for spawning the medium materials with the mycelia supplied from the mycelia supply device thereby to produce a solid medium.

The heater is connected to a saturated steam source for heating the medium materials to a temperature ranging from 100 to 120° C with steam supplied from the saturated steam source thereby to sterilize the medium materials. The cooler has a sprinkler adjacent to the upstream end thereof for sprinkling water to cool the sterilized medium materials down to about 15° C and moisten the medium materials. Since water is added to the medium materials after they have been sterilized with heat the amount of cooling energy required is reduced. The cooler also includes a water jacket mounted on the bottom thereof as an auxiliary cooler. The time required to cool the medium materials may be further shortened by operating the sprinkler and the water jacket together.

The system also includes a packaging mechanism having a cylindrical feed tube coupled to the cooler and having a feed screw disposed therein. A sheet of polyethylene is supplied around the feed tube from a sheet supply device, and a longitudinal seam of the sheet is thermally sealed by a heat sealer. The bottom of a cylindrical packaging sheet form which has been filled with the solid medium is vertically moved by a cylinder, so that the packaging sheet will be cylindrically shaped as completely as possible. The cylindrical form of the packaging sheet prevents any thinned-out portion from being formed, thus protecting the solid medium from being dried.

The above and further objects, details and advantages of the present invention will become apparent from the following detailed description of preferred embodi-

DESCRIPTION OF THE PREFERRED EMBODIMENTS

Figure 1:
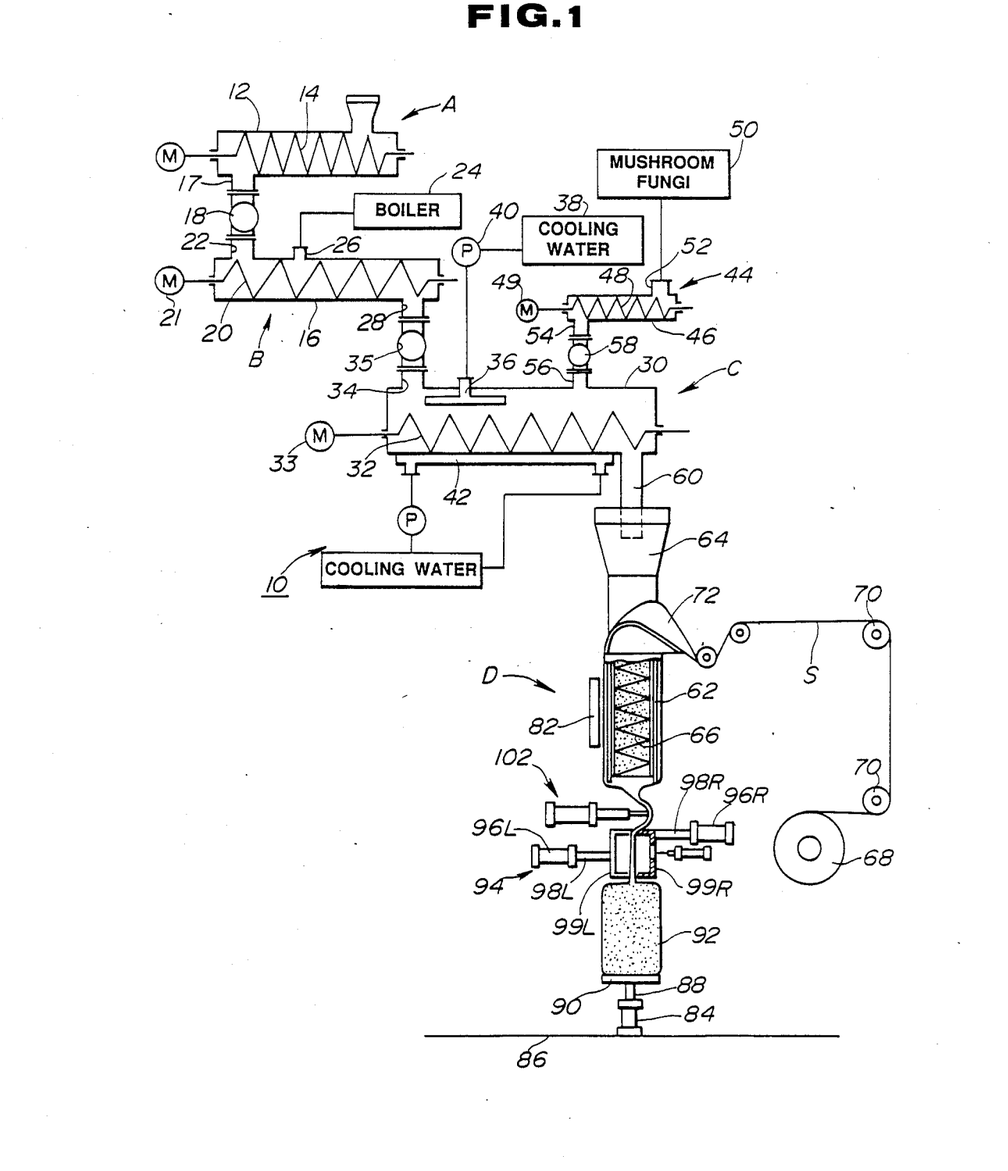
FIG. 1 is a schematic view of a solid medium manufacturing system according to the present invention.

As schematically shown in FIG. 1, a solid medium manufacturing system 10 according to the present invention has a mixing station A comprising a mixer 12 in the form of a cylindrical closed container which houses therein an agitator 14 for agitating and mixing medium materials. In the illustrated embodiment, the medium materials include sawdust produced from a wood material and a nutritional material such as rice bran. The wood material may for example be Japanese cedar, Japanese beech, Japanese oak, Japanese zelkova, maple, or any of other appropriate woods. The nutritional material is not limited to rice bran, but may be corn bran, adlay bran, barley bran, or a synthetic reagent.

The system 10 also includes a heating station B comprising a horizontal heater 16 in the form of a cylindrical closed container connected to the mixer 12 through a rotary valve 18 and housing a feed means 20 comprising a feed screw which is rotatable by a motor 21. The medium materials discharged from the outlet 17 of the mixer 12 are metered by the rotary valve 18 and supplied from an inlet 22 into the heater 16. The heater 16 is coupled to a saturated steam source 24 comprising a boiler and supplied with saturated steam as a medium for heating and sterilizing the medium materials from the boiler 24 through an opening 26. The heater 16 has an outlet 28 on the lower surface at the downstream end thereof. The medium materials delivered through the heater 16 by the feed screw 20 are sent through the outlet 28 to a next cooling/spawning station C.

The cooling/spawning station C comprises a cooler 30 in the form of a cylindrical closed container housing a feed screw 32 which is rotatable by a motor 33. The cooler 30 has an inlet 34 on its upstream end which is connected to the outlet 28 of the heater 16 through a rotary valve 35. The cooler 30 has a sprinkler 36 disposed therein near the upstream end thereof for scattering cooling water supplied from a cooling water source 38 via a pump 40, into the cooler 30 to cool the medium materials to a suitable temperature. A water jacket 42 is attached to the lower surface of the cooler 30 for additionally heating the medium materials in the cooler 30. The sprinkler 36 and the water jacket 42 are of a general construction and will not be described in detail.

The cooling/spawning station C also includes a fungi or mycelia supply device 44 comprising a supply unit 46 in the form of a cylindrical closed container housing a feed screw 48 which is rotatable by a motor 49. The supply unit 46 is connected to a mushroom fungi or mycelia source 50 through a rotary valve or the like (not shown) for being supplied with mushroom fungi or mycelia from the mycelia source 50 via an inlet 52. The supplied mycelia are progressively fed from one end to the other end of the supply unit 46 upon rotation of the feed screw 48. The mycelia are then discharged from an outlet 54 on the other end of the supply unit 46, metered by a metering feeder 58, and introduced into the cooler 30 through an inlet 56 disposed near the downstream end of the cooler 30. The medium materials in the cooler 30 are spawned with the mycelia thus introduced.

The culture medium thus manufactured by spawning the medium materials with the mycelia is delivered from an outlet 60 on the downstream end of the cooler 30 into a packaging station D. The packaging station D packages the culture medium by shaping a polyethylene sheet, for example, into a cylindrical bag, thermally sealing the seam of the cylindrical bag, stuffing the culture medium into the bag, and then fastening the opening of the bag.

Figure 2:
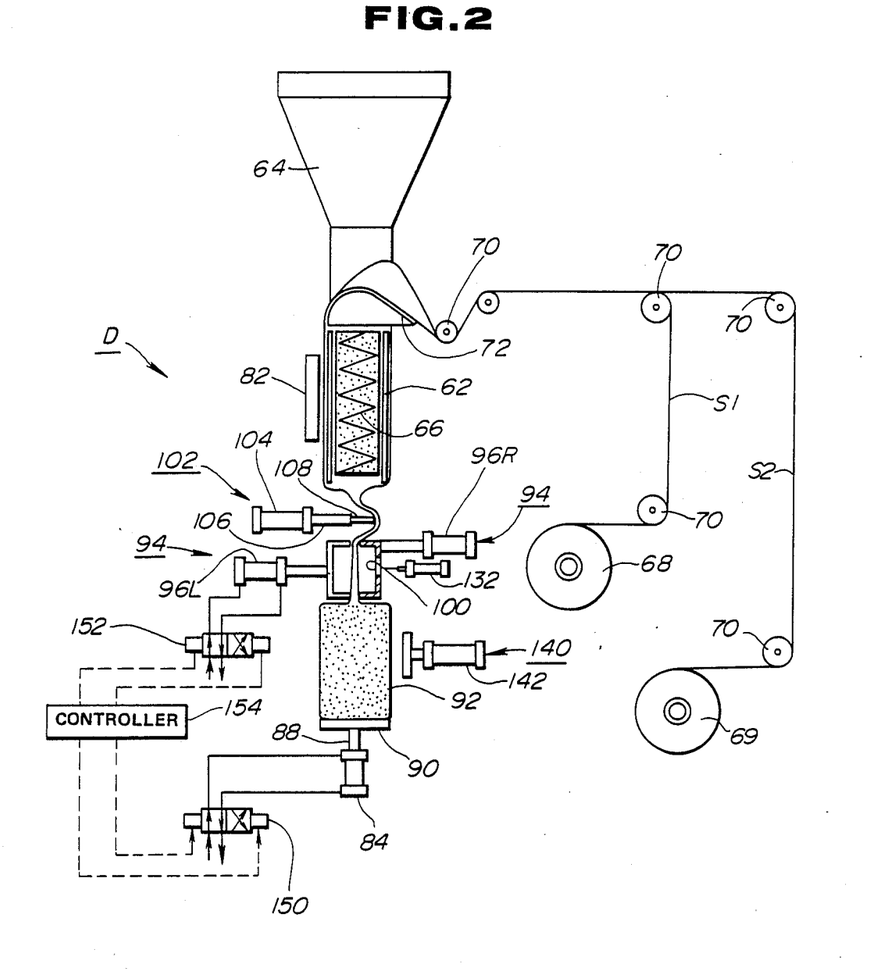
FIG. 2 is a schematic view of a packaging station of the system.
Figure 3:
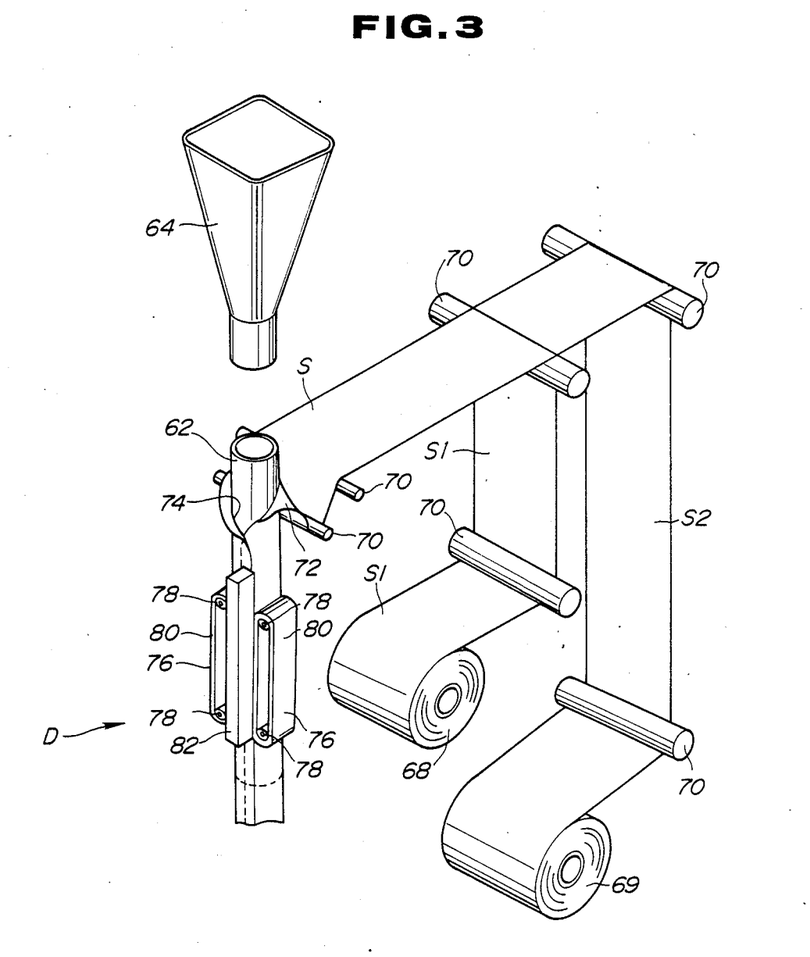
FIG. 3 is an enlarged fragmentary perspective view of the packaging station shown in FIG. 2, showing a sheet supply means.

As shown in FIG. 2, the packaging station D has a vertically disposed feed tube 62 for receiving the solid medium discharged from the outlet 60 of the cooler 30 through a hopper 64. The feed tube 62 has a sufficient diameter, and a feed screw 66 is rotatably supported in the feed tube 62, the feed screw 66 being rotatable by a motor (not shown) disposed in the feed tube 62. A sheet supply means is positioned near the feed tube 62. As illustrated in FIGS. 2 and 3, the sheet supply means includes a support frame (not shown), two rollers 68, 69 rotatably supported on the support frame and supporting respective rolls of sheets S1, S2, and a plurality of tension rollers 70 rotatable in ganged relation to the rollers 68, 69. The sheets S1, S2 supplied from the rollers 68, 69 are overlapped on each other and supplied to the feed tube 62. Therefore, the produced bag is of a double-ply structure. Although not shown, the sheets S1, S2 have a multiplicity of small air holes defined therein for keeping the packaged culture medium active.

The double-ply sheet S engages a guide member 72 disposed around an upper portion of the feed tube 62, and then is delivered downwardly in surrounding relation to the feed tube 62 through a feed passage 74 defined between the feed tube 62 and the guide member 72. The sheet S is thus fed by means of a pair of feeders 76 positioned below the guide member 72 and disposed in diametrically confronting relation around the feed tube 62. Each of the feeders 76 comprises a pair of upper and lower rollers 78 rotatably supported on a support frame (not shown) and an endless belt 80 trained around the rollers 78. When the sheet S is delivered downwardly, the feeders 76 are pressed against the feed tube 62 by suitable means. The sheet S is shaped into a cylindrical bag around the feed tube 62 between the feeders 76, with the seam of the bag being thermally sealed by a heat sealer 82. The heat sealer 82 is of a conventional structure, and will not be described in detail.

If the packaged culture medium were dried, the planted mycelia might be killed. Therefore, it is preferable that the completed bag be as cylindrical as possible and free of any thinned-out portions including the sealed portion. According to the illustrated embodiment, as shown in FIGS. 1 and 2, a cylinder 84 is vertically supported on a support table 86 and has a vertically movable rod 88 with its distal end fixed to a support plate 90 for supporting the bottom of a bag 92 thereon. The cylinder 84 is actuated to vertically move the bottom of the bag 92 for making the shape of the bag 92 as cylindrical as possible.

The packaging station D further includes a gripper device 94 (FIGS. 1 and 2). The gripper device 94 comprises two laterally spaced cylinders 96L, 96R disposed horizontally one on each side of the package bag 92. The cylinders 96L, 96R have respective horizontally movable rods 98L, 98R with their distal ends fixed to gripper members 99L, 99R each of C-shaped cross section. One of the gripper members 99R has an opening 100, and a cutter (described later on) is disposed near the opening 100. A presser device 102 is positioned above, or upstream of, the gripper device 94 and comprises a single horizontal cylinder 104 having a horizontally movable piston 106 with a horizontal presser plate 108 fixed to its distal end.

Figure 4:
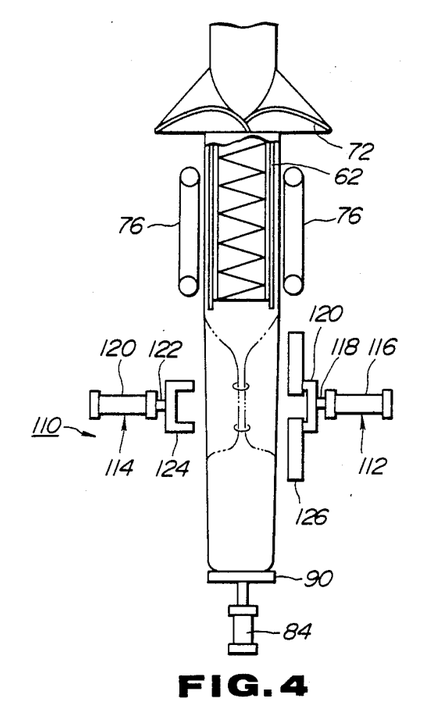
FIG. 4 is a schematic view of a bundling device in the packaging station.

As shown in FIG. 4, a bundling device 110 comprising a stapler is constructed of a presser 112 and a receiver 114. The presser 112 comprises a horizontal cylinder 116 having a horizontally movable rod 118, and a presser element 120 of C-shaped cross section fixed to the distal end of the rod 118. The receiver 114 is also composed of a horizontal cylinder 120 and having a horizontally movable rod 122, and a receiver element 124 of C-shaped cross section fixed to the distal end of the rod 122. Two magazines 126 housing a number of bundling members or wire staples are mounted on the presser element 120.

Operation of the system will be described below. First, sawdust and rice bran are mixed at a suitable ratio in the mixer 12. The mixed medium materials are metered by the rotary valve 18 and introduced from the inlet 22 into the heater 16, in which the medium materials are delivered by the feed screw 20 while being sterilized by the heat of steam supplied from the saturated steam source 24. The medium materials are heated at about 110° C for about 3 minutes when the steam pressure is 2 Kg/cm$^2$.g, and for about 30 seconds when the steam pressure is 6 Kg/cm$^2$.g.

The sterilized medium materials are then charged into the cooler 30 through the rotary valve 35 and the inlet 34. The medium materials are fed in the cooler 30 by the feed screw 32 while they are being cooled down to 12° C through 15° C and moistened by cooling water scattered by the sprinkler 36. The proportion of the sprinkled cooling water to the medium materials is in the range of 60 to 65 % by weight. To shorten the time in which to cool the medium materials, cooling water is also supplied to the water jacket 42 from a cooling water source. When the cooled medium materials approach the downstream end of the cooler 30, a metered amount of mushroom fungi or mycelia is supplied from the metering feeder 58 via the inlet 56 into the cooler 30 in which the medium materials are spawned with the supplied mycelia, thus producing a solid medium for the cultivation of mushrooms.

Figure 5:
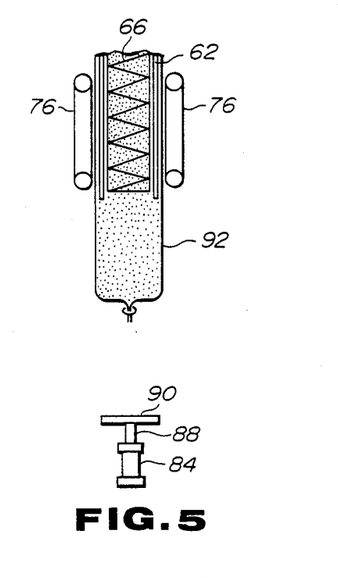
FIGS. 5 through 9 are views showing a progressive process of packaging a solid medium.
Figure 6:
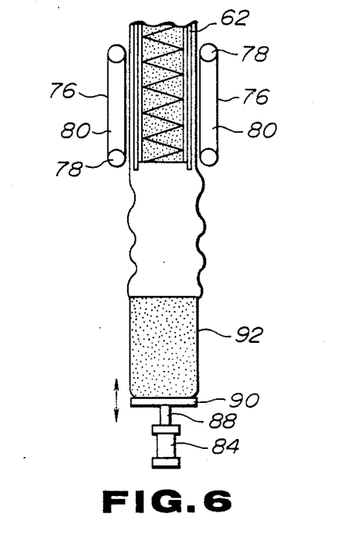

The solid medium thus produced is then delivered from the outlet 60 through the hopper 64 into the feed tube 62 by which a certain amount of solid medium fed by rotation of the feed screw 66 is stuffed into a package bag 92 prepared in advance, as shown in FIG. 5. When the solid culture medium is filled in the package bag 92, the belts 80 are rotated by the rollers 78 of the feeders 76 to lower the package bag 92 until the bottom thereof abuts against the upper surface of the support plate 90, as shown in FIG. 6. The cylinder 84 is operated to vertically move the rod 88 to vibrate the culture medium in the package bag 92 for shaping the bag 92 into a cylindrical form.

Figure 7:
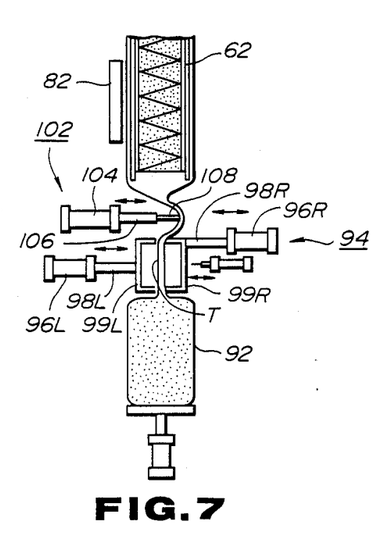

Then, as shown in FIG. 7, the cylinders 96L, 96R are operated to extend the rods 98L, 98R until the upper end of the package bag 92 is gripped by the gripper members 99L, 99R, whereupon a thinned-out portion T is formed on the upper end of the bag 92. Then, the cylinder 104 is operated to extend the rod 106 to push the thinned-out portion T to the right. As a result, the thinned-out portion T is stretched, and the culture medium is compressed and well stuffed in the package bag 92.

Figure 8:
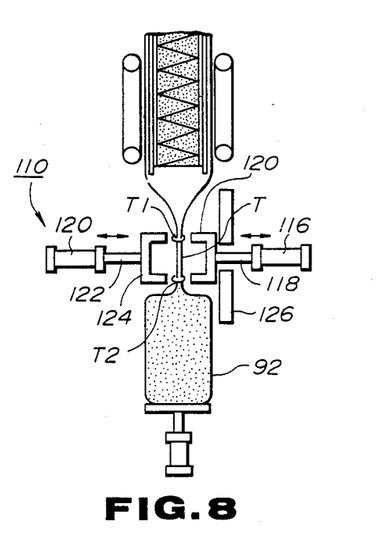

After the culture medium is cylindrically shaped in the package bag 92, the cylinder 116 is operated to move the rod 118 and the presser element 120 to the left for thereby removing two staples out of the magazines 126, as shown in FIG. 8. At the same time, the cylinder 120 is also operated to move the rod 122 and the receiver element 124 to the right. The staples are pressed against the receiver element 124 across the thinned-out portion T, which is shaped into a rod form and bundled at two positions T1, T2. The intermediate portion between the bundled portions T1, T2 is then cut off to form the upper end of the package bag 92 now produced and the bottom of a package bag to be produced next. The thinned-out portion T is stapled in a space defined between the two gripper members 99L, 99R. Therefore, the rods 118, 122 of the cylinders 116, 120 should be movable in directions normal to the rods 98L, 98R of the cylinders 96L, 96R of the gripper device.

Figure 9:
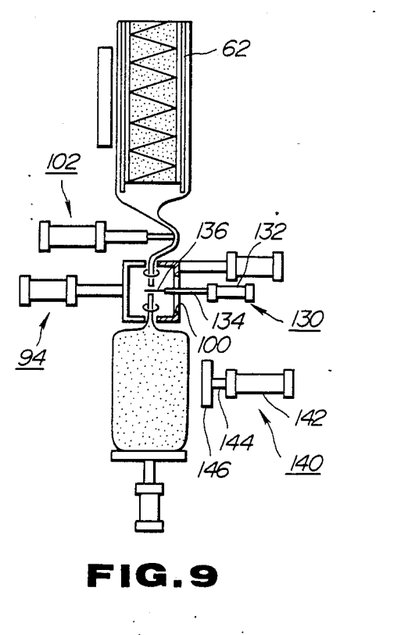

The thinned-out portion T is cut off by a cutter device 130 shown in FIG. 9. The cutter device 130 comprises a single cylinder 132 mounted on the support frame and having a horizontally movable rod 134, with a cutter 136 fixed to the distal end of the rod 134. When the cylinder 132 is operated, the rod 134 enters the space defined between the gripper members 99L, 99R through the opening 100 defined in the gripper member 99R, until the cutter 136 cuts off the intermediate portion between the stapled portions T1, T2. After the thinned-out portion T has been cut off, a pusher device 140 disposed downstream of the cutter device 130 delivers the completed culture medium bag onto a belt conveyor (not shown) of a next conveyor station. In the illustrated embodiment, the pusher device 140 is mounted on the support frame and comprises cylinder 142 having horizontally movable rod 144 having a distal end to which there is attached a thin pusher plate 146 for pushing the bag onto the belt conveyor.

As shown in FIG. 2, the eight cylinders 84, 96L, 96R, 104, 116, 120, 132, 142 are connected to a controller 154 through respective directional control valves of identical construction (only directional control valves 150, 152 for the cylinders 84, 96L are shown), so that operation of these cylinders will be controlled by the controller 154.

Figure 10:
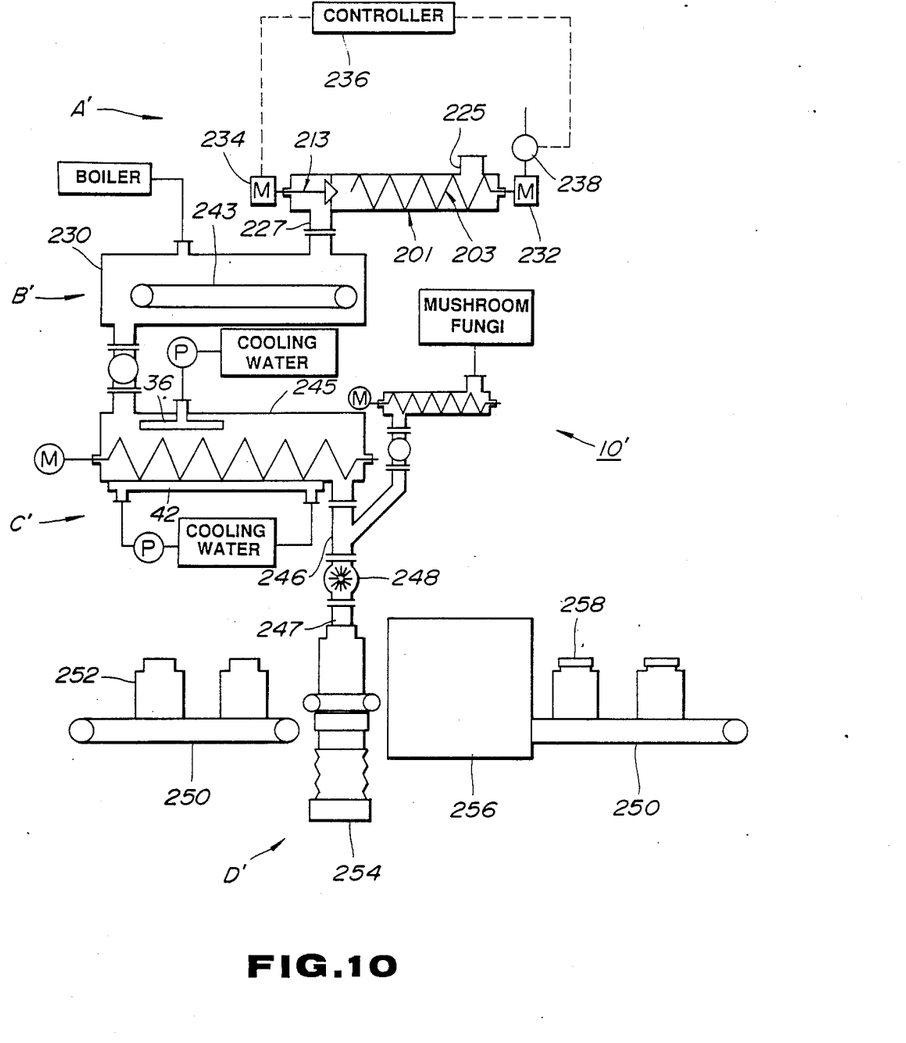
FIG. 10 is a schematic view of a solid medium manufacturing system according to another embodiment of the present invention.
Figure 11:
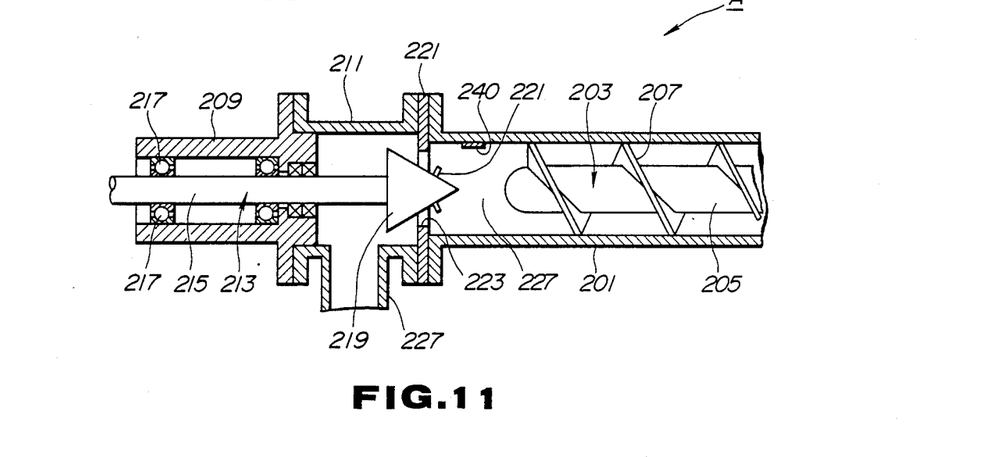
FIG. 11 is an enlarged fragmentary view of a mixer in the system illustrated in FIG. 10.

FIGS. 10 and 11 show a solid medium manufacturing system 10' according to another embodiment of the present invention. Those parts in FIGS. 10 and 11 which are identical to those of the preceding embodiment are denoted by identical reference numerals. The system 10' includes a mixing station A' having a mixer 201 in the form of a cylindrical closed container in which there is rotatably disposed a feed screw 203 serving as a feed means. The feed screw 203 comprises an axially extending shaft 205 and a helical blade 207 mounted on the shaft 205. The mixer 201 is connected to a cylindrical casing 209 through a substantially cylindrical connector 211, with a crusher 213 being rotatably supported in the casing 209. The crusher 213 comprises a shaft 215 rotatably supported by bearings 217 and having one end coaxially spaced from one end of the shaft 205, and a conical crusher element 219 fixedly mounted on said one end of the shaft 215 and having a plurality of pins 221 on its conical surface. The crusher element 219 has a tip half end portion projecting into the mixer 201 through an opening 223 defined centrally in a spacer 224 in the form of a disc interposed between the mixer 201 and the connector 211. Medium materials supplied into the mixer 201 from an inlet 225 near the upstream end of the mixer 201 are progressively delivered upon rotation of the feed screw 203 into a space 226 defined in the downstream end of the mixer 201. Then, the medium materials are broken up by the pins 221 on the crusher element 219, pass through the opening 223, after which the medium materials are delivered through an outlet 227 of the connector 221 into a heater 230 of a heating station B'. Since the medium materials are delivered into the heater 230 after they have been broken up or dispersed by the crusher element 219, the medium materials can be uniformly heated by the heater 230 It will be understood by of skill in the art that the heater 230 is hermetically sealed by the medium materials which are compacted in the space 226.

As shown in FIG. 10, the screw 203 and the crusher 213 are drivable by motors 232, 234, respectively, which are connected to a controller 236. An ammeter 238 is connected between the motor 232 and the controller 236 for driving the crusher 213 dependent on how the medium materials are compacted in the space 226. More specifically a current flowing through the motor 232 is detected by the ammeter 238, and the controller 236 energizes the motor 234 dependent on the detected current. Alternately, as shown in FIG. 11, a pressure sensor 240 may be mounted on an inner surface of the mixer 201, and the motor 234 may be controlled dependent on a signal from the pressure sensor 240.

The heating station B' is of substantially the same construction as that of the heating station of the preceding embodiment except that a belt conveyor 243 is disposed as a feed means, rather than the feed screw 20, in the heater 230. In a cooling/spawning station C', the medium materials are spawned with mushroom fungi or mycelia not in a cooler 245, but in a spawning passage 246 after the medium materials have been discharged from the cooler 245. Thereafter, the produced culture medium is delivered through a crusher 248 into an outlet 247.

A filling station D' comprises belt conveyors 250 for delivering bottles, and a vertically movable load cell 254. When one of delivered bottles 252 is placed on the load cell 254, a metered amount of culture medium is charged into the bottle. When the charging of the culture medium is completed, the bottle is fed into a capper 256 disposed immediately downstream of the load cell 254, and a cap 258 is mounted on the bottle 252 by the capper 256. Thereafter, the bottle 252 is fed to another station by the downstream belt conveyor 250. Rather than the filing station D', the packaging station D of the preceding embodiment may of course be employed in the system 10'.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A multi-stage system for manufacturing a solid medium, comprising:
   a mixer for mixing medium materials;
   a heater coupled to said mixer for sterilizing the medium materials supplied from said mixer, with heat;
   a mycelia supply device for supplying cycelia; and
   a cooler coupled to said heater for cooling the medium materials supplied from said heater and also coupled to said mycelia supply device for spawning the medium materials with the mycelia supplied from said mycelia supply device thereby to produce a solid medium, and
   a packaging mechanism for packaging the solid medium, comprising:
   a cylindrical member coupled to said cooler and having a feed screw disposed therein, sheet supply means for supplying a packaging sheet around said cylindrical member to shape the packaging sheet into a cylindrical form, sealing means for sealing a seam of the cylindrical packaging sheet form, bundling means for bundling upper and lower ends of the cylindrical packaging sheet form, and cutter means for cutting off the cylindrical packaging sheet form near the bundled ends and
   means for vertically moving a bottom of said cylindrical packaging sheet form which is filled with said solid medium, gripper means for gripping the upper end of said cylindrical packaging sheet form, and presser means for laterally pressing the upper end of the cylindrical packaging sheet form.

2. A system according to claim 1, further including a saturated steam source coupled to said heater for supplying steam to the heater to enable the heater to sterilize the medium materials with heat of the steam.

3. A system according to claim 1, wherein said cooler includes a sprinkler disposed near an upstream end thereof and has an inlet disposed near a downstream end thereof and connected to said mycelia supply device.

4. A system according to claim 3, wherein said cooler also includes a water jacket.

5. A system according to claim 1, wherein said mixer comprises a first cylindrical member, a feed screw including a first shaft rotatably disposed coaxially in said first cylindrical member and a helical blade mounted on said first shaft, a second cylindrical member coupled to said first cylindrical member through a connector connected to said heater, a second shaft rotatably disposed in said second cylindrical member coaxially with said first shaft, and a crusher including a conical member mounted on an inner end of said second shaft and a plurality of pins mounted on a surface of said conical member.

6. A multi-stage system for manufacturing a solid medium, comprising:
   a mixer for mixing medium materials;
   a heater coupled to said mixer for sterilizing the medium materials supplied from said mixer, with heat;
   a mycelia supply device for supplying mycelia; and
   a cooler coupled to said heater for cooling the medium materials supplied from said heater and also coupled to said mycelia supply device for spawning the medium materials with the mycelia supplied from said mycelia supply device thereby to produced a solid medium, and a packaging mechanism for packaging the solid medium, comprising:

a cylindrical member coupled to said cooler and having a feed screw disposed therein, sheet supply means for supplying a packaging sheet around said cylindrical member to shape the packaging sheet into a cylindrical form, sealing means for sealing a seam of the cylindrical packaging sheet form, bundling means for bundling upper and lower ends of the cylindrical packaging sheet form, and cutter means for cutting off the cylindrical packaging sheet form near the bundled ends and means for preventing dryness of the packaged solid medium by vertically moving a bottom of said cylindrical packaging sheet form which is filled with said solid medium, thereby assuring improved cylindrical shaping thereof and preventing formation of a thinned-out portion therein, gripper means for gripping the upper end of said cylindrical packaging sheet form, and presser means for laterally pressing the upper end of the cylindrical packaging sheet form.

7. A system according to claim 6 wherein said sheet supply means supplies a double-ply sheet.

* * * * *